(12) United States Patent
Kane et al.

(10) Patent No.: US 6,204,746 B1
(45) Date of Patent: Mar. 20, 2001

(54) THERMAL OVERLOAD MECHANISM

(75) Inventors: Adam Stuart Kane, Morristown; Walter Pelosi, Randolph, both of NJ (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 09/394,589

(22) Filed: Sep. 13, 1999

(51) Int. Cl.[7] ............ H01H 85/26; H02H 9/00; H02H 3/22

(52) U.S. Cl. ............ 337/32; 337/17; 337/401; 337/405; 361/119; 361/124

(58) Field of Search ............ 337/18, 19, 20, 337/32, 31, 14, 15, 17, 401, 404, 405, 414, 51; 361/117–119, 120, 124

(56) References Cited

U.S. PATENT DOCUMENTS

| | | | |
|---|---|---|---|
| 3,886,408 | * 5/1975 | Klayum et al. | 317/16 |
| 4,212,047 | * 7/1980 | Napiorkowski | 361/124 |
| 4,233,641 | * 11/1980 | Baumbach | 361/119 |
| 4,314,304 | * 2/1982 | Baumbach | 361/124 |
| 4,326,231 | * 4/1982 | Coren | 361/119 |
| 4,380,036 | * 4/1983 | Coren | 361/119 |
| 4,710,846 | * 12/1987 | Heisinger | 361/119 |
| 4,758,921 | * 7/1988 | Hung | 361/119 |
| 4,876,621 | * 10/1989 | Rust et al. | 361/58 |
| 5,224,012 | * 6/1993 | Smith | 361/119 |
| 5,684,667 | * 11/1997 | Hsieh | 361/119 |
| 6,025,982 | * 2/2000 | Brower | 361/119 |

FOREIGN PATENT DOCUMENTS

| | | | |
|---|---|---|---|
| 8-335795 | * 12/1996 | (JP) | H05K/9/00 |
| 11-68889 | * 3/1999 | (JP) | H04M/1/00 |

* cited by examiner

Primary Examiner—Leo P. Picard
Assistant Examiner—Anatoly Vortman

(57) ABSTRACT

A thermal overload mechanism for providing protection to tip and ring conductors in a telecommunications system in the event of a power cross occurrence of telephone lines with power lines. The thermal overload mechanism includes a clip having front and rear spring members dimensioned for seating about a spacer element. The spacer element includes one or more recesses defined therein for accommodating securement of solid state devices. The recesses formed in the spacer elements contain a breachable membrane or wall which is breakable in the event the membrane temperature exceeds a predetermined temperature such as a temperature occurring in the event of a power cross situation. A contact configured for seating within the recess between the membrane and solid state device is provided for maintaining electrical contact with the tip and ring wires. During a power cross situation, high current causes the temperature of the solid state devices increase, thereby causing a breach of the membrane and providing a direct grounding path for the tip and ring wires through the rear spring and common ground.

9 Claims, 1 Drawing Sheet

THERMAL OVERLOAD MECHANISM

BACKGROUND OF THE INVENTION

1. Field of the Invention

The present invention pertains to a protection device for use in the telecommunications field for protecting equipment connected to tip and ring conductor pairs. More particularly, the present invention relates to a thermal overload mechanism for providing a grounding path for tip and ring conductors during a power cross occurrence.

2. Description of the Related Art

Telecommunications systems typically employ protection mechanisms such as grounding devices located proximate a service subscriber location or central office to protect telecommunications lines from detrimental power surges and voltage spikes. The voltage spikes are usually caused by lightning striking telephone lines, and the power surges are caused by power crosses between telephone lines and high voltage power cables which occur, for example, as a result of high winds. In particular, grounding devices are used to provide a path to common ground for voltage surges caused by lightning strikes to prevent such surges from damaging equipment connected to tip and ring wires as well as to prevent injury to personnel working on the wires or on equipment.

In the event of a power cross situation, however, which results in the application of high currents and resulting high temperatures to protection mechanisms, a grounding path must also be formed to provide for the discharge of power surges which would, otherwise, adversely affect delicate telecommunications equipment and injure personnel. Known grounding protection mechanisms of the type employing solid state devices typically include a combination of a fuseable pellet or link in conjunction with a biasing spring. The fusable pellet will melt from the heat generated during a power cross occurrence, in which event the biasing spring will maintain connection of the tip/ring pair through a common ground. The drawback of this technique, however, is that the additional elements (such as the spring and fuseable link) must be added to the protection mechanisms during assembly, thereby increasing the cost and assembly time for such devices.

SUMMARY OF THE INVENTION

The present invention is directed to a thermal overload mechanism for use in protecting telecommunications equipment from damage resulting from power cross occurrences. The inventive mechanism includes a clip element connectable to a grounding path and having front and rear spring members. A spacer having a recess formed therein holds a solid state device which is electrically connected to the tip and ring conductors. The recess has a meltable or breachable back wall membrane. When the solid state device is placed within the recess and the spacer is placed within the clip element, the front spring member presses against the solid state device and the rear spring member presses against the membrane to provide a clamping force between the solid state device and the membrane. In the event of a power cross occurrence wherein current resulting in increased heat is applied to the solid state device, the heat will melt or break the back wall membrane of the spacer, causing direct electrical contact between the second spring member and the tip and ring conductors. In this manner, a grounding path is provided from the tip and ring conductors through the clip element and to common ground without traversing a conducting path through the solid state device. This serves to protect equipment connected to the tip and ring conductors as well as personnel in contact with such equipment and conductors from damaging current generated by the solid state device during a power cross situation.

In a preferred embodiment, a lead contact is included for interfacing the tip and ring conductors with the solid state device and membrane.

Other objects and features of the present invention will become apparent from the following detailed description considered in conjunction with the accompanying drawing. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures described herein.

BRIEF DESCRIPTION OF THE DRAWING

The FIG. 1 depicts an exploded view of a thermal overload mechanism in accordance with a preferred embodiment of the present invention.

DETAILED DESCRIPTION OF THE PRESENTLY PREFERRED EMBODIMENTS

Figure 1:
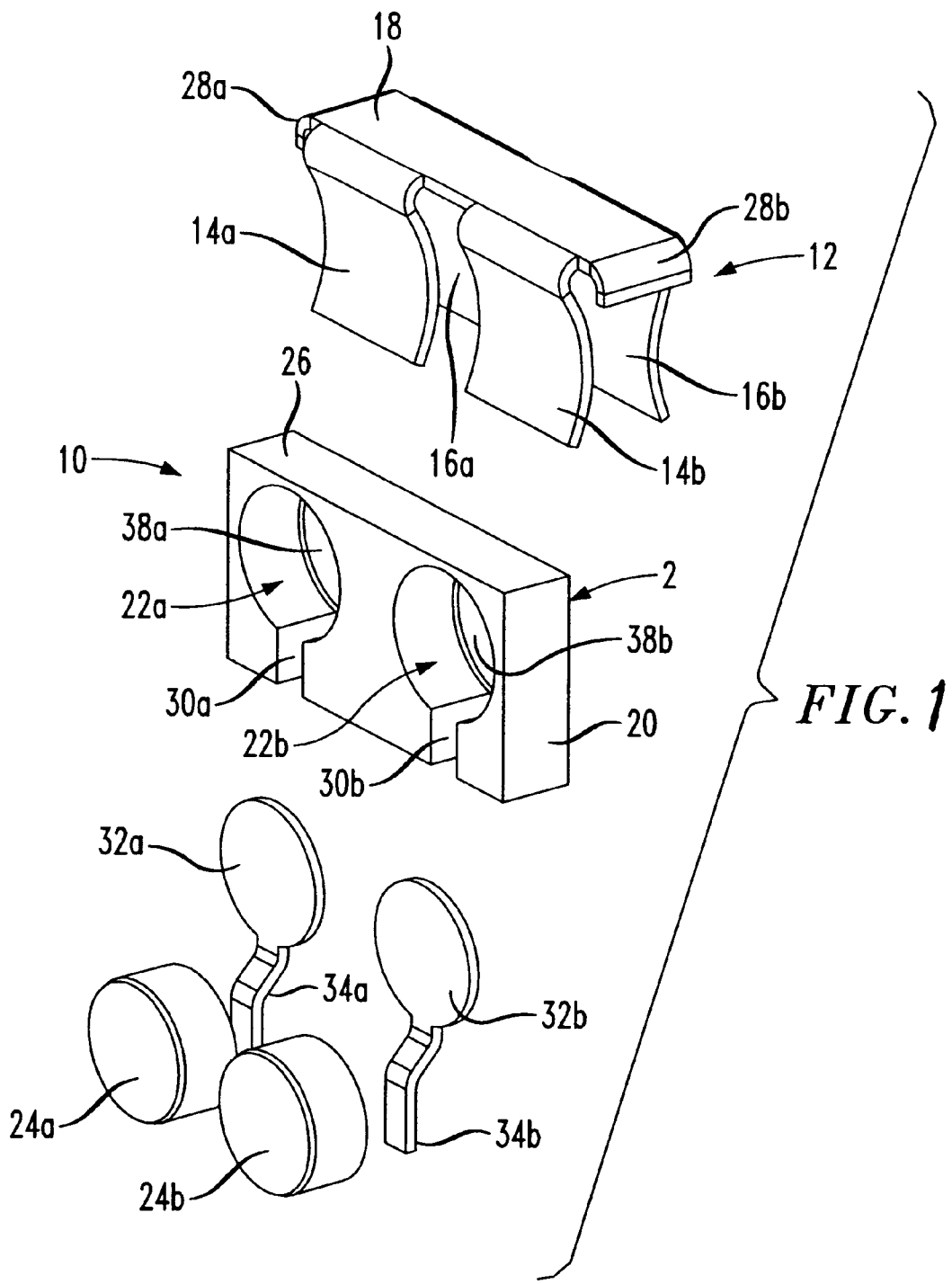

An exploded view of a thermal overload mechanism 10 in accordance with a currently preferred embodiment of the invention is shown as having a clip member 12 constructed of electrically conductive material, such as metal. Clip member 12 includes a pair of front spring members 14a and 14b, and a pair of rear spring members 16a and 16b. The spring members are attached to a clip base 18 which is connected to a common ground (not shown). The spring members are oriented, arranged and biased such that each spring member in each pair is directed to a spring member in the other pair, i.e. so that spring members 14a and 16a are directed toward each other. In this manner, a spring or clamping force is produced against an object placed between the spring member pairs, as explained more fully below.

The thermal overload mechanism 10 further includes a spacer element 20, preferably constructed of a nonelectrically conducting or insulating material such as plastic. The spacer element 20 has a pair of recesses 22a, 22b formed therein for housing a pair of solid state devices 24a and 24b, respectively. A thin breachable or breakable membrane 38 is formed at the back of each recess 22a and 22b. The membranes are preferably formed of the same material as the spacer 20, e.g. plastic, and are integrally formed therewith such as by molding. The membranes are designed to melt or break at temperatures exceeding approximately 210° F., i.e. at temperatures reached during power cross occurrences.

In a preferred embodiment, the recesses 22a and 22b are formed with an opening or slot 30 for accommodating a paddle-shaped conductor having a contact 32 configured for seating within the recesses 22, and a handle portion or lead 34 configured for seating within the slot 30. In this design, the handle portions 34a and 34b serve as electrical contacts and interfaces with tip and ring conductors provided to, for example, central office, public phone, and commercial and/or residential sites where various terminal devices may be connected.

When assembled, the contacts 32 are placed within recesses 22 so that handles 34 seat within slots 30 and extend downward to provide connection to the tip and ring connectors through, for example, an interface with a circuit board (not shown). The solid state devices 24, which are typically thyristors, are contained in the spacer recesses 22a and 22b so that the contacts 32 are sandwiched between the solid state devices 24 and the membranes 38. The spacer 20 has a top wall 26 having a thickness proximate the thickness of the clip base 18 so that when the spacer 20 having the contacts 32 and the solid state devices 24 seated therein is placed within clip 12 between the front spring member 14 and rear spring member 16, the spacer is secured therein. For further securement, lips 28 are integrally formed with base 18 and spaced apart to accommodate the length of the top wall 26 of the spacer. When spacer 20 is positioned within clip 12, the spring members provide a squeezing or clamping force against the solid state devices and the membranes.

As explained more fully above, the thermal overload mechanism 10 is situated at the point of entry of the outside-located telephone line connection to the internally located tip and ring conductors and is connected by the contacts 32 through the solid state devices 24. The outside telephone lines are oftentimes located closely proximate high voltage power lines that are carried on common above-ground support structures such as telephone poles, etc. In the event of a power cross situation, such as during a high wind storm where power lines may come into contact with telephone lines, high voltages and currents will be provided directly to the solid state devices 24, causing the solid state devices to reach high temperatures. This, in turn, can allow current to cause damage to the tip and ring conductors and, hence, to the equipment connected thereto and personnel operating or repairing such equipment. However, and in accordance with the present invention, when high current resulting in high temperatures are provided to the solid state devices, the contacts 32 will also heat up and cause a breach or breakage of the membranes 38 which are held against leads 32 by spring members 14 and 16. Once broken or melted, the leads 32 will be in direct contact with the rear spring members 16a and 16b, thereby providing a direct grounding path for the tip and ring conductors through the rear spring members and preventing damage which would otherwise be caused by the heating of the solid state devices 24.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it will be appreciated that electrical contact may be made between the thermal overload mechanism and the tip and ring wires without the use of contacts 32, such as by direct connection of the tip and ring wires to the solid state devices. It is further expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A thermal overload mechanism for interfacing tip and ring conductors of a telecommunications system with a common ground upon occurrence of a high temperature condition, comprising:

a clip having a front spring member, a rear spring member and a base connected to said front and rear spring members, said clip being electrically connectable to a common ground;

a solid state device electrically connectable to the tip and ring conductors for providing voltage protection and over-current protection to the tip and ring conductor; and a spacer defining a recess accommodating said solid state device and having a heat sensitive membrane across an opening of said recess, said membrane being positioned in thermal contact with said solid state device with said solid state device contained within said recess, and said spacer being seated between said front and rear spring members, so that said front spring member is in physical contact with said solid state device and said rear spring member is in physical contact with said membrane, and said membrane being breachable in response to the high temperature condition in which the temperature of said solid state device exceeds a threshold temperature so as to provide a grounding path between the tip and ring conductors through said rear spring member and said clip base.

2. The thermal overload mechanism of claim 1, further comprising an electrical contact having a lead portion, said electrical contact being positioned between said membrane and said solid state device, and said lead portion being in electrical contact with said tip and ring conductors.

3. The thermal overload mechanism of claim 2, wherein said contact is formed in a paddle-shape having a handle portion comprising said lead portion.

4. The thermal overload mechanism of claim 1, wherein said spacer is formed of an insulating material.

5. The thermal overload mechanism of claim 1, wherein said front spring member comprises a first front spring member and a second front spring member, said rear spring member comprises a first rear spring member and a second rear spring member, said recess comprises a first recess and a second recess, and said solid state device comprises a first solid state device and a second solid device, each of said first and said second solid state devices being arranged for providing electrical contact with a respective one of the tip and ring conductors.

6. The thermal overload mechanism of claim 1, wherein said spacer has a length, said clip base further comprising a pair of lips dimensioned for seating about the length of said spacer for facilitating securement of said spacer within said clip.

7. The thermal overload mechanism of claim 5, wherein said spacer is formed of an insulating material.

8. The thermal overload mechanism of claim 1, wherein said membrane is breachable at temperatures exceeding 200° F.

9. The thermal overload mechanism of claim 1, wherein said membrane and said spacer are integrally formed.

* * * * *